(12) United States Patent
Golberg (10) Patent No.: US 6,231,263 B1
(45) Date of Patent: May 15, 2001

(54) ADJUSTABLE ADAPTOR

(75) Inventor: Jeffery O. Golberg, Elbow Lake, MN (US)

(73) Assignee: PBMark, Inc., Wilmington, DE (US)

( * ) Notice: Subject to any disclaimer, the term of this patent is extended or adjusted under 35 U.S.C. 154(b) by 0 days.

(21) Appl. No.: 09/325,501

(22) Filed: Jun. 3, 1999

(51) Int. Cl.$^7$ ........................................... F16B 7/10
(52) U.S. Cl. ............................ 403/51; 403/340; 464/175
(58) Field of Search .................................. 277/636, 635, 277/634, 391; 464/175, 173; 403/50, 51, 344, 311, 134, 340

(56) References Cited

U.S. PATENT DOCUMENTS

| | | | |
|---|---|---|---|
| 461,501 | * 10/1891 | Kumming et al. | 403/344 |
| 670,072 | * 5/1901 | Fleming | 403/344 |
| 843,906 | * 2/1907 | Murchie | 403/344 |
| 860,369 | * 7/1907 | Grundy | 403/344 |
| 915,370 | * 3/1909 | McNiel | 403/311 |
| 918,078 | * 4/1909 | McCaffrey | 403/344 |

\* cited by examiner

Primary Examiner—Lynne H. Browne
Assistant Examiner—Aaron Dunwoody
(74) Attorney, Agent, or Firm—Volpe and Koenig, P.C.

(57) ABSTRACT

An adjustable adaptor for fitting about various diameters of shafts thereby eliminating the need for various sized adaptors. The inventive device includes a first adaptor portion and a second adaptor portion that are adjustably connectable with one another forming an adjustable adaptor for fitting about various diameter shafts such as an axle shaft of vehicle. The first adaptor portion has a first brace member and a plurality of staggered first ribs extending from the first brace member. The second adaptor portion has a second brace member and a plurality of staggered second ribs extending from the second brace member for adjustably mating with the plurality of first ribs for fitting about various diameters of shafts. The ribs preferably have an undercut for allowing a boot or other object to catchably attach and retain the adjustable adaptor. The adjustable adaptor may be utilized with boots, as a bushing or as a seal.

12 Claims, 9 Drawing Sheets

ADJUSTABLE ADAPTOR

BACKGROUND OF THE INVENTION

1. Field of the Invention

The present invention relates generally to adaptor devices and more specifically it relates to an adjustable adaptor for fitting about various diameters of shafts thereby eliminating the need for various sized adaptors.

Adaptors are utilized for attaching larger structures to smaller structures. For example, adaptors are often times utilized upon an axle shaft of a vehicle for fitting the boot upon. Because there are various diameters of axle shafts on various types of vehicles, different sizes of adaptors are required to ensure that the desired size is available. This not only increases the overall cost of a boot kit, but requires an automotive store to maintain more inventory of adaptors than desired. There are other uses for adaptors that fit about shafts such as bushings and seals. Hence, there is a need for a single device that is capable of adjustably fitting upon various diameters of shafts thereby eliminating the need for various sizes of adaptors, bushings and seals.

2. Description of the Prior Art

Adaptor devices have been in use for years. Typically, an adaptor device is comprised of a solid collar that requires the entire shaft to be removed to insert the collar upon. Alternatively, a split collar is sometimes utilized which is basically a solid collar with a slit within for allowing expansion of the collar for positioning about the shaft without requiring removal of the shaft. Because both types of collars have a constant interior diameter, various sizes of the collars/adaptors must be retained for fitting upon different sizes of shafts.

While these devices may be suitable for the particular purpose to which they address, they are not as suitable for fitting about various diameters of shafts thereby eliminating the need for various sized adaptors. Conventional collars and adaptors are suitable for only one size of shaft. Multiple sizes of collars and adaptors must be retained by businesses thereby making an undesirable large inventory.

In these respects, the adjustable adaptor according to the present invention substantially departs from the conventional concepts and designs of the prior art, and in so doing provides an apparatus primarily developed for the purpose of fitting about various diameters of shafts thereby eliminating the need for various sized adaptors.

SUMMARY OF THE INVENTION

In view of the foregoing disadvantages inherent in the known types of adaptors now present in the prior art, the present invention provides a new adjustable adaptor construction wherein the same can be utilized for fitting about various diameters of shafts thereby eliminating the need for various sized adaptors.

The general purpose of the present invention, which will be described subsequently in greater detail, is to provide a new adjustable adaptor that has many of the advantages of the adaptors mentioned heretofore and many novel features that result in a new adjustable adaptor which is not anticipated, rendered obvious, suggested, or even implied by any of the prior art adaptors, either alone or in any combination thereof.

To attain this, the present invention generally comprises a first adaptor portion and a second adaptor portion that are adjustably connectable with one another forming an adjustable adaptor for fitting about various diameter shafts such as an axle shaft of vehicle. The first adaptor portion has a first brace member and a plurality of staggered first ribs extending from the first brace member. The second adaptor portion has a second brace member and a plurality of staggered second ribs extending from the second brace member for adjustably mating with the plurality of first ribs for fitting about various diameters of shafts. The ribs preferably have an undercut for allowing a boot or other object to catchably attach and retain the adjustable adaptor. The adjustable adaptor may be utilized with boots, as a bushing or as a seal.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide an adjustable adaptor that will overcome the shortcomings of the prior art devices.

Another object is to provide an adjustable adaptor that fits various diameters of shafts and axles.

An additional object is to provide an adjustable adaptor that is catchably positionable within a boot for an axle.

A further object is to provide an adjustable adaptor that can be attached to an axle shaft without requiring removal of the axle shaft.

Another object is to provide an adjustable adaptor that saves time and money when replacing a boot for an axle.

A further object is to provide an adjustable adaptor that reduces the amount of inventory required.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF THE PREFERRED EMBODIMENT

Turning now descriptively to the drawings, in which similar reference characters denote similar elements throughout the several view, FIGS. 1 through 9 illustrate an adjustable adaptor 10, which comprises a first adaptor portion 40 and a second adaptor portion 50 that are adjustably connectable with one another forming an adjustable adaptor for fitting about various diameter shafts 12 such as an axle shaft 12 of vehicle. The first adaptor portion 40 has a first brace member 42 and a plurality of staggered first ribs 44 extending from the first brace member 42. The second adaptor portion 50 has a second brace member 52 and a plurality of staggered second ribs 54 extending from the second brace member 52 for adjustably mating with the plurality of first ribs 44 for fitting about various diameters of shafts 12. The ribs preferably have an undercut for allowing a boot 20 or other object to catchably attach and retain the adjustable adaptor. The adjustable adaptor may be utilized with boots 20, as a bushing or as a seal.

Figure 2:
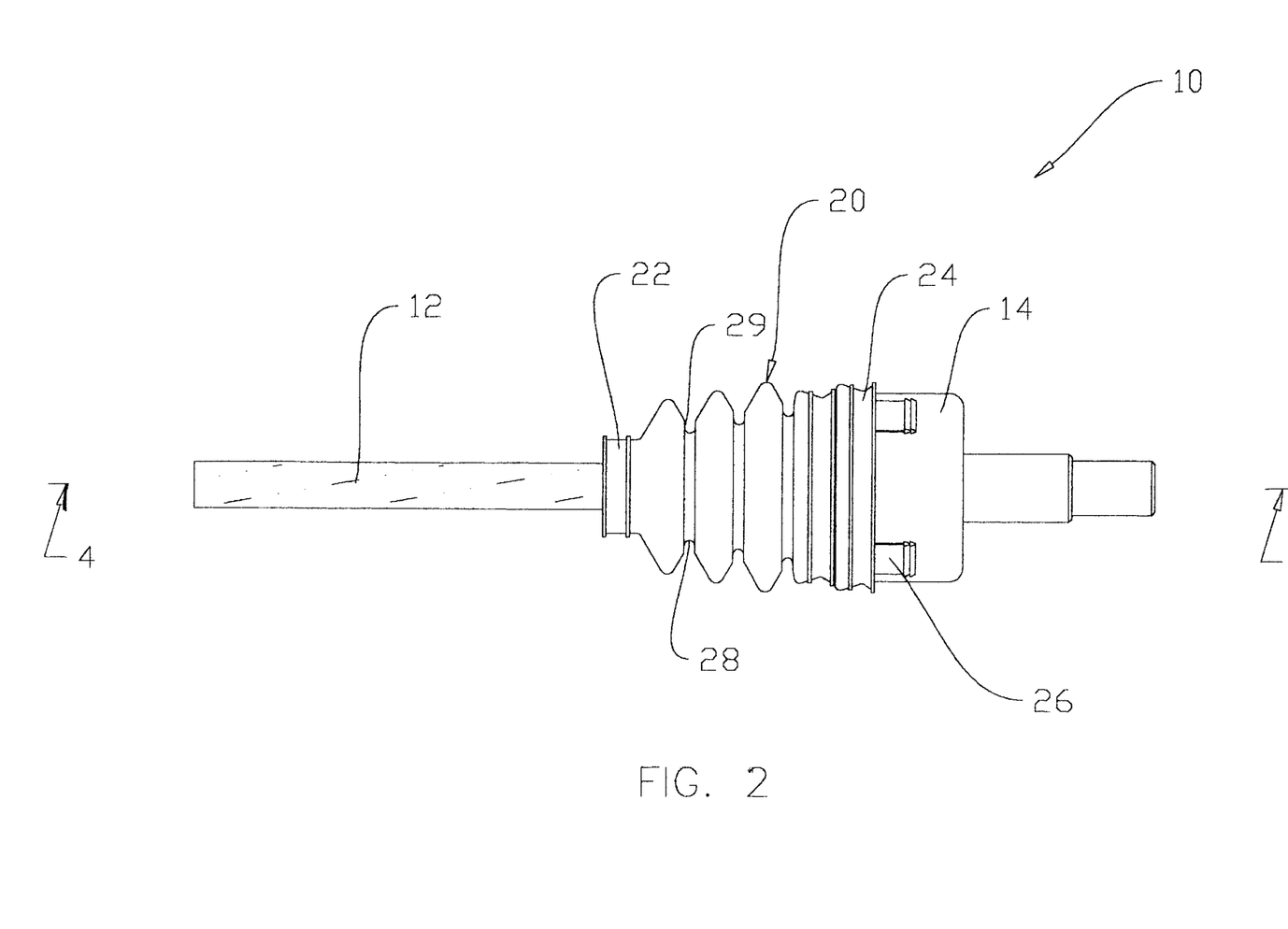
FIG. 2 is a side view of the present invention within a boot upon an axle shaft.
Figure 3:
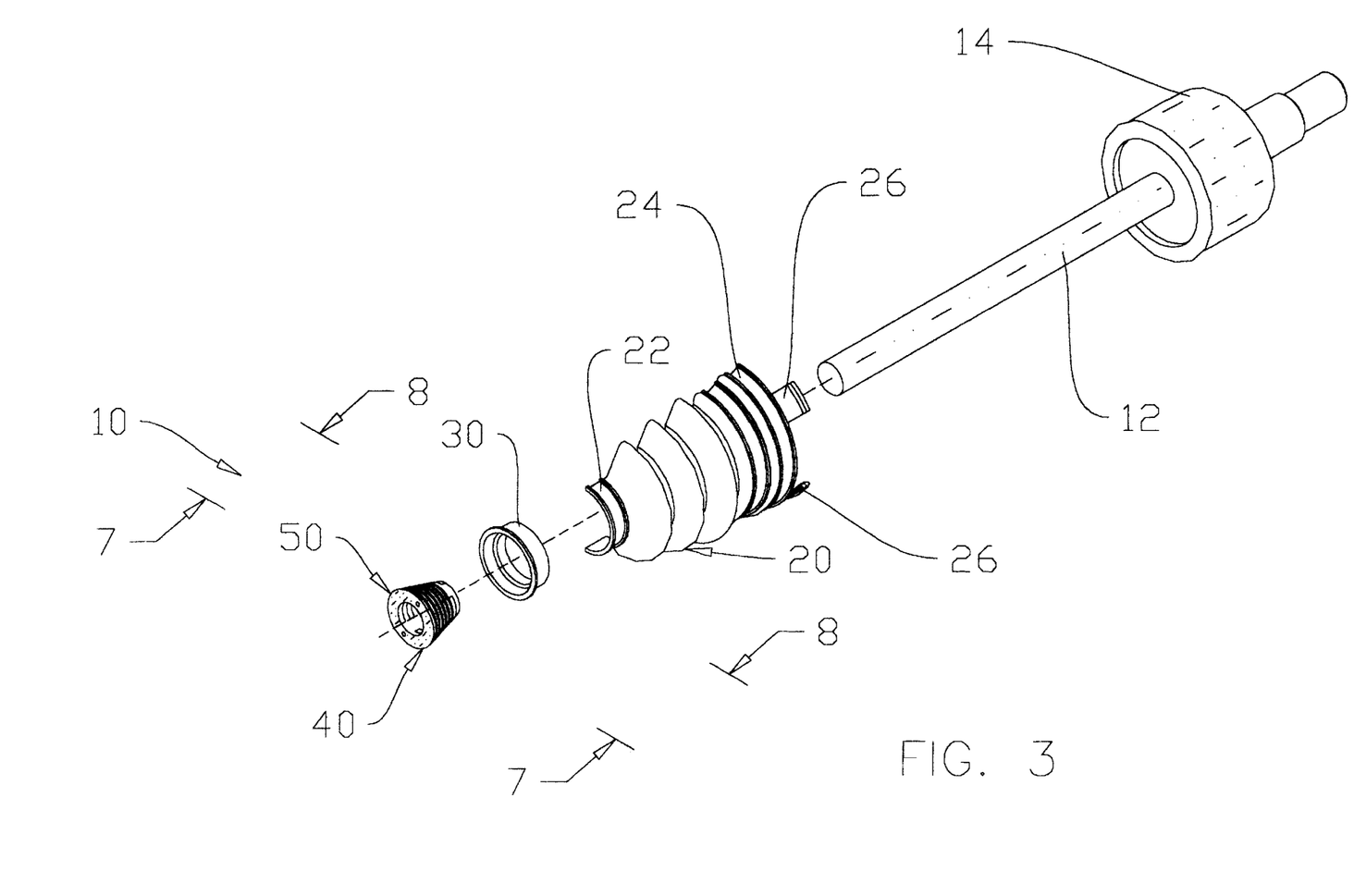
FIG. 3 is an exploded upper perspective view.
Figure 4:
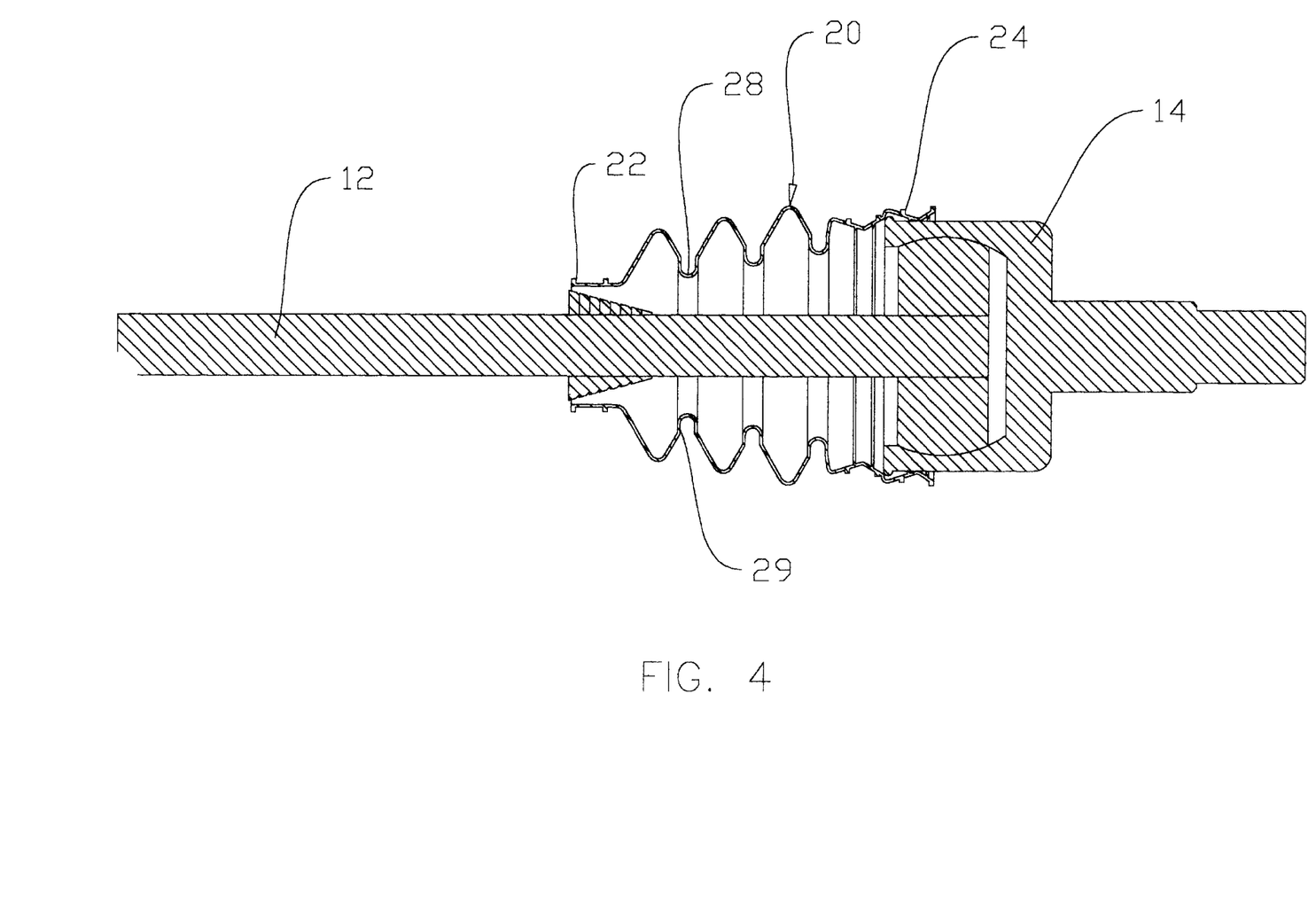
FIG. 4 is a cross sectional view taken along line 4—4 of FIG. 2 of the drawings.

A split boot 20 is shown in FIGS. 2, 3 and 4 of the drawings that has many of the advantages of conventional boots 20 while having some additional benefits. The split boot 20 has two halves that have corresponding mating edges. Each of the mating edges has a slit within with a catch portion for catchably retaining the opposing halve during the bonding process thereby ensuring that the split boot 20 is not attached improperly. The split boot 20 is for retaining a lubricant, such as grease, within the joint of an axle shaft 12 upon a vehicle.

These mating edges receive an adhesive chemical or solvent prior to connecting the halves about the axle shaft 12 for permanently securing the halves thereby forming the split boot 20. This adhesive chemical or solvent preferably includes a colorant added for increasing the visibility of the locations upon the boot 20 where applied thereby ensuring no gaps exist. The split boot 20 is constructed of a resilient and flexible material.

As with conventional boot 20s, the split boot 20 shown has a first end 22 and a second end 24. The first end 22 is generally smaller in diameter than the second end 24 as best shown in FIGS. 3 and 4 of the drawings. The second end 24 of the split boot 20 is positionable about the joint housing 14 of a vehicle. The first end 22 is positionable about a split collar 30 or the adjustable adaptor 10 as connected about an axle shaft 12 as best shown in FIG. 4 of the drawings.

The split boot 20 preferably has a plurality of tabs 26 attached to the second end 24 for allowing gripping by the user during installation. The tabs 26 preferably have serrated surfaces for assisting the individual grasping the tabs 26 even with contaminated hands.

As best shown in FIG. 4, the second end 24 preferably has a V-shaped crosssection for preventing the second end 24 from bunching up or wrinkling when a clamp is applied which creates a "spit channel" for grease to escape from. This also allows the second end 24 of the split boot 20 to be attached to the various sizes of joint housing 14s without a channel created. The V-shaped second end 24 also allows easier installation upon the joint housing 14 since the outer perimeter of the second end 24 is significantly larger than the inner portion of the second end 24.

As best shown in FIG. 4 of the drawings, the split boot 20 has a plurality of living hinges 28 for increasing the flexibility of the split boot 20 during operation of the vehicle. A pair of vertical walls 29 extend from each of the living hinges 28 before tapering upwardly toward adjacent vertical walls 29. The vertical walls 29 are preferably extended compared to a conventional boot 20 for increasing the linear length of the boot 20 thereby allowing the boot 20 to fully accommodate the full turning range of the vehicle while maintaining its shape. The increased length of the vertical walls 29 prevents the boot 20 from "puckering" as commonly occurs within boots 20 with shorter vertical walls 29 during significant turning of a vehicle. "Puckering" of the boot 20 significantly shortens the useful life of the boot 20.

Figure 5:
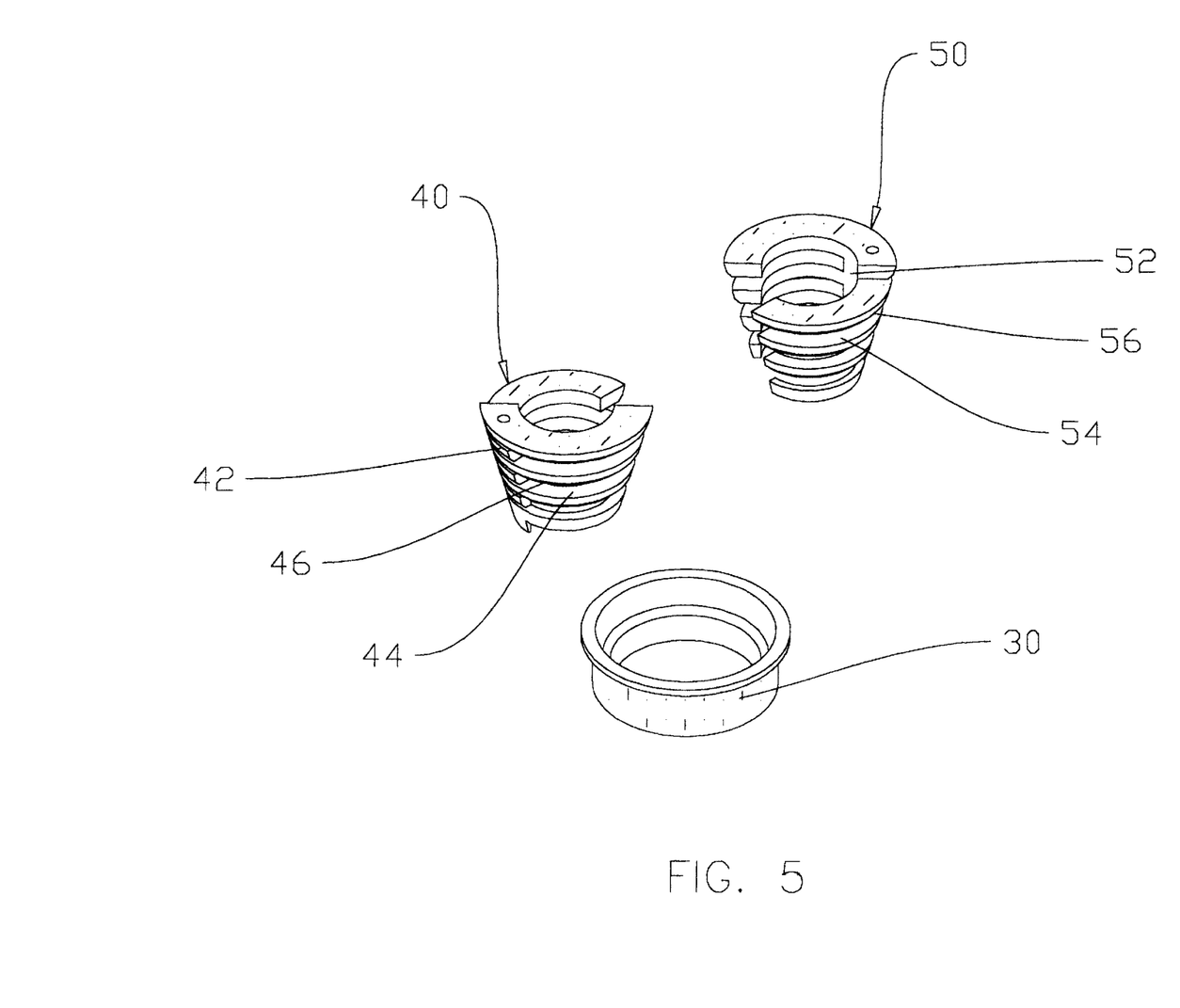
FIG. 5 is an exploded upper perspective view of the present invention.

As best shown in FIG. 5 of the drawings, the first adaptor portion 40 slidably mates with the second adaptor portion 50 thereby forming an adaptor, bushing or seal.

Figure 9:
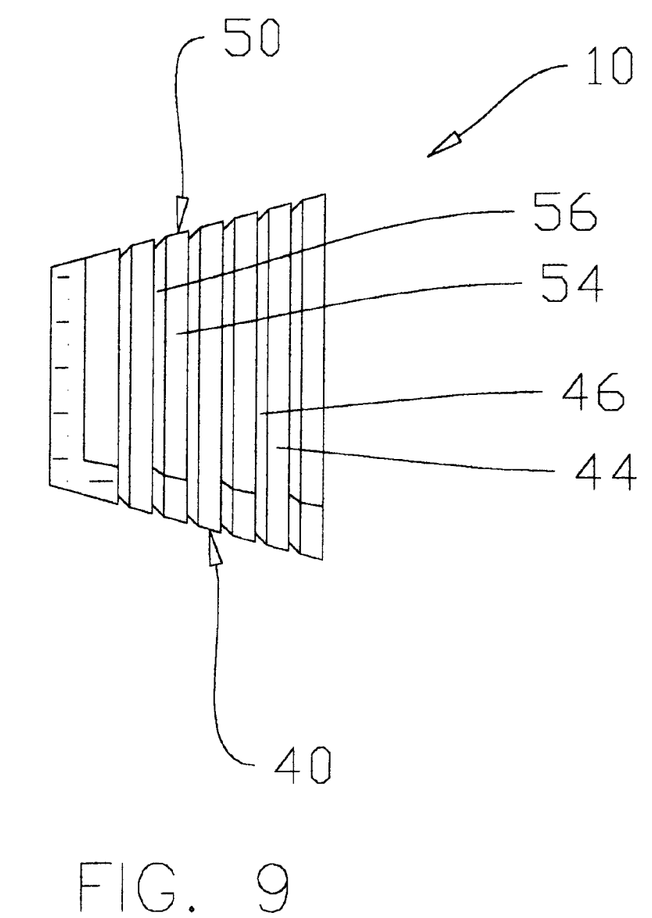
FIG. 9 is a side view of the present invention.

The first adaptor portion 40 and the second adaptor portion 50 preferably form a conical shape as best shown in FIGS. 3 and 9 of the drawings. This conical shape allows fitting within the desired structure, such as a boot 20, regardless of the diameter of the shaft 12. The first adaptor portion 40 and the second adaptor portion 50 are preferably constructed of a resilient and flexible material thereby allowing the portions 40, 50 to easily expand about the shaft 12.

Figure 1:
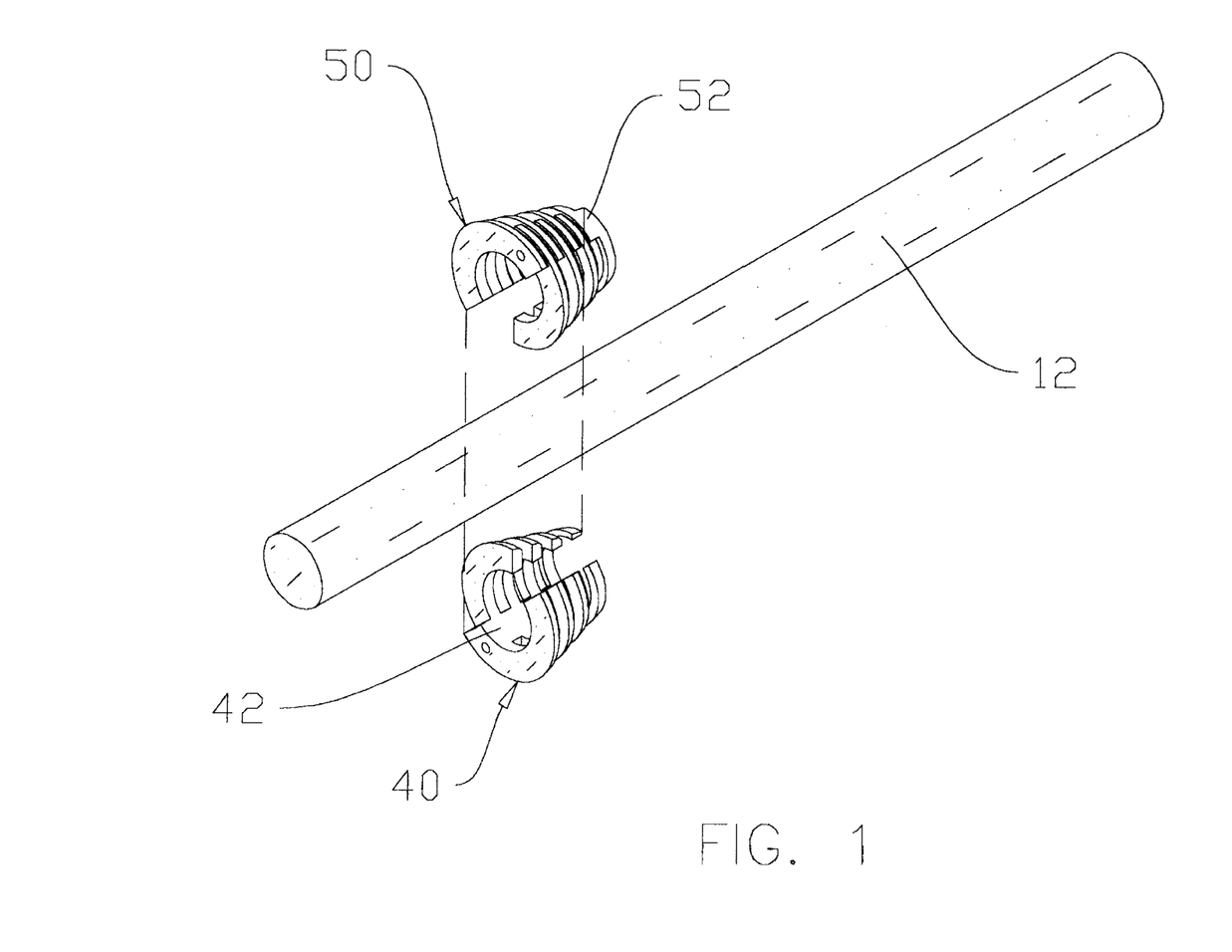
FIG. 1 is an exploded upper perspective view of the present invention positioned about an axle shaft.
Figure 6:
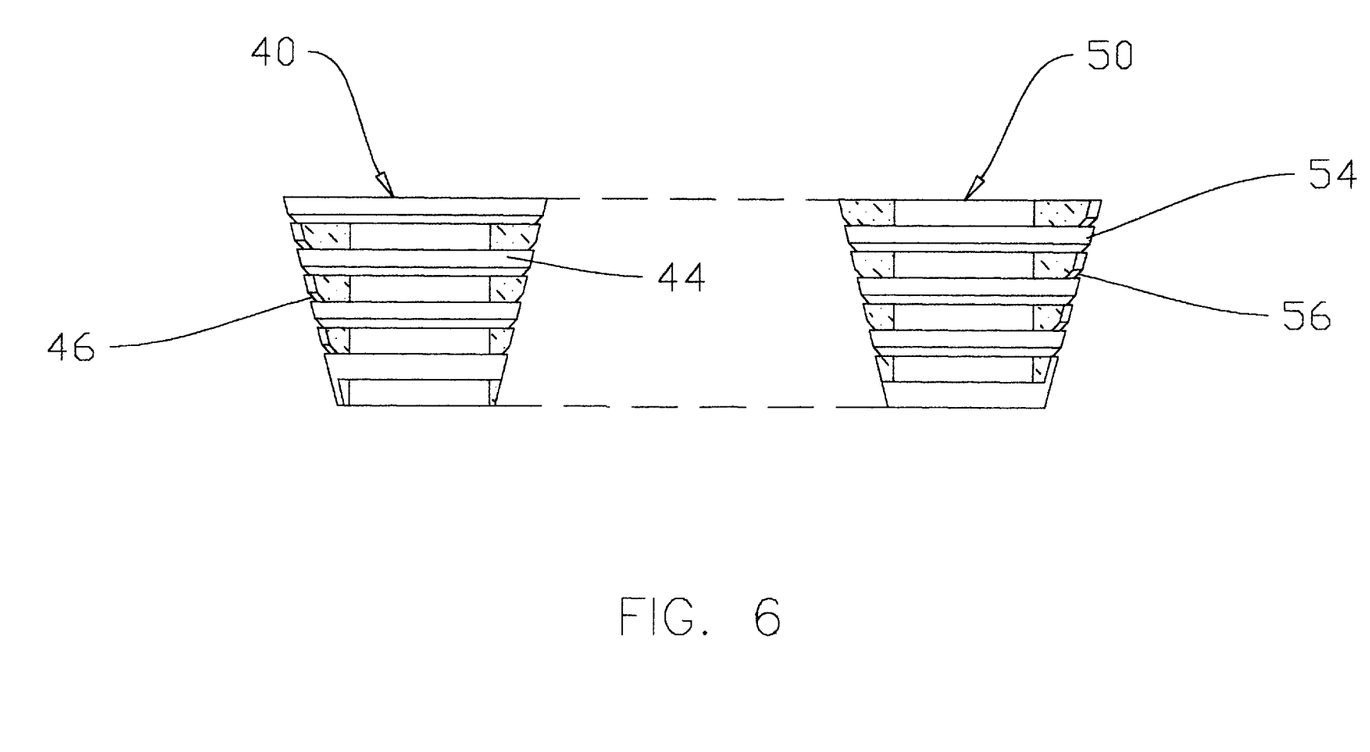
FIG. 6 is an exploded side view of the present invention.
Figure 7:
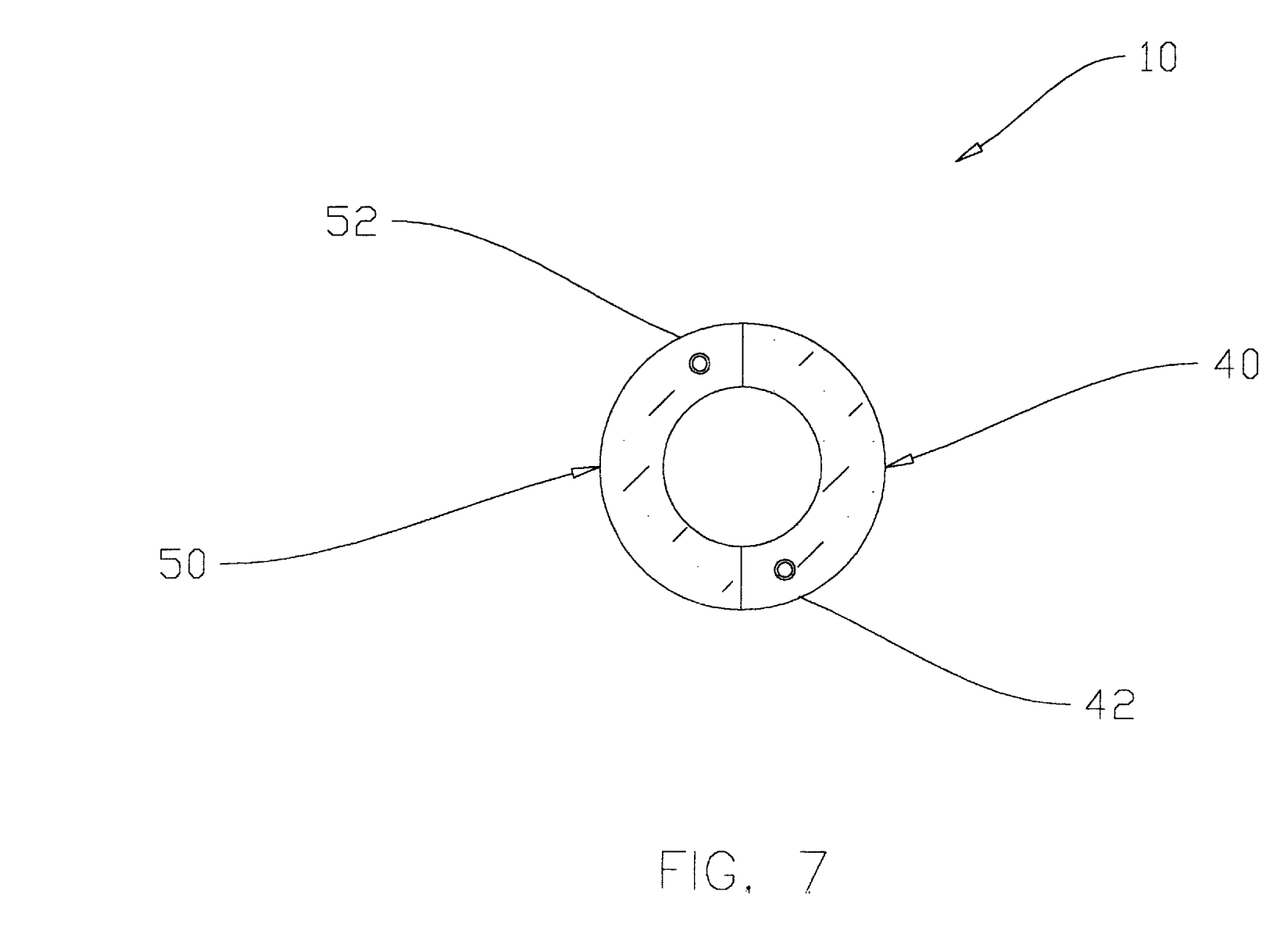
FIG. 7 is a cross sectional view taken along line 7—7 of FIG. 3 of the drawings.
Figure 8:
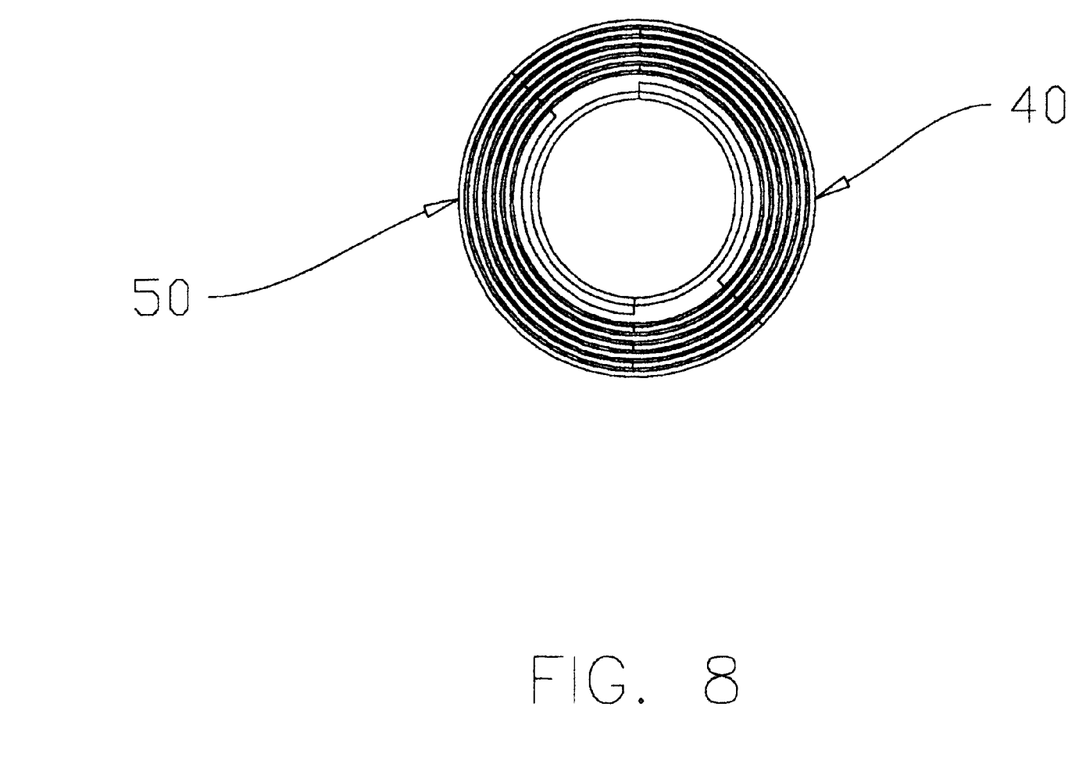
FIG. 8 is a cross sectional view taken along line 8—8 of FIG. 3 of the drawings.

As best shown in FIGS. 1, 5 and 6 of the drawings, the first adaptor portion 40 has an open sided conical shape. The first adaptor portion 40 has a first brace member 42 extending along a side of the first adaptor portion 40 opposite of the open side. As further shown in FIGS. 1, 5 and 6 of the drawings, a plurality of first ribs 44 extend from both sides of the first brace member 42 forming a C-shaped cross-sectional area. The first ribs 44 are staggered with respect to each side as shown in FIG. 6 of the drawings. The distal ends of the first ribs 44 form the open side that is positionable about the shaft 12 as shown in FIG. 1 of the drawings. As best shown in FIGS. 6 and 9 of the drawings, each of the first ribs 44 has a first undercut 46 sloping inwardly toward the narrowing portion of the first adaptor portion 40.

As best shown in FIGS. 1, 5 and 6 of the drawings, the second adaptor portion 50 also has an open sided conical shape. The second adaptor portion 50 has a second brace member 52 extending along a side of the second adaptor portion 50 opposite of the open side. As further shown in FIGS. 1, 5 and 6 of the drawings, a plurality of second ribs 54 extend from both sides of the second brace member 52 forming a C-shaped cross-sectional area. The second ribs 54 are staggered with respect to each side as shown in FIG. 6 of the drawings. The distal ends of the second ribs 54 form the open side that is positionable about the shaft 12 as shown in FIG. 1 of the drawings. As best shown in FIGS. 6 and 9 of the drawings, each of the second ribs 54 has a second undercut 56 sloping inwardly toward the narrowing portion of the second adaptor portion 50.

As shown in FIG. 6 and 9 of the drawings, the first ribs 44 are aligned with respect to the second ribs 54 thereby filling in open portions between the ribs 44, 54 of the adaptor portions 40, 50. The brace members 42, 52 both are positioned within the open sides of the opposing adaptor portion 40, 50. The first undercut 46 and the second undercut 56 within the ribs 44, 54 allow the first end 22 of the split boot 20 to be catchably retained upon the adjacent rib as shown in FIG. 4 of the drawings. The conical shape formed by the combined adaptor portions 40, 50 has a constant inner diameter lumen thereby sealably engaging the axle shaft 12. A split collar 30 is preferably included within the kit for fitting upon axle shafts 12 that are out of the range of the adjustable adaptor 10.

In use, the user removes the damaged old boot 20 from the axle shaft 12 and cleans the axle shaft 12 and joint housing 14. The user then applies grease within the joints. The user then applies the colored solvent to the mating edges of the two halves of the split boot 20 and then engages the opposing ends of the halves of the split boot 20 about the axle shaft 12 for curing. While the solvent is curing within the split boot 20, the user then positions the first adaptor portion 40 and the second adaptor portion 50 about the axle shaft 12 as shown in FIG. 1 of the drawings. The ribs 44, 54 are aligned with the respective adaptor portions 40, 50 as best shown in FIG. 9 of the drawings thereby forming a conical structure. If the axle shaft 12 is of a larger diameter, the ribs 44, 54 simply spread outwardly thereby conforming to the size of the shaft 12. Because the outer surface of the adjustable adaptor 10 is increased with larger sized shaft 12, the first end 22 of the split boot 20 would have to be attached to a narrower portion of the adjustable adaptor 10. After the solvent has cured, the user then pulls upon the tabs 26 thereby positioning the second end 24 of the split boot 20 snugly about the joint housing 14. A clamp is attached about the second end 24 thereby flattening out the V-shaped second end 24 without a crease within. The user then slides the adjustable adaptor 10 toward the loosely positioned first end 22 of the split boot 20. The adjustable adaptor 10 is positioned into the first end 22 of the split boot 20 as shown in FIG. 4 of the drawings. The inner edge of the first end 22 is thereafter catchably retained between the undercuts 46, 56 of a pair of larger ribs 44, 54 and the top surface of an adjacent pair of smaller ribs 44, 54. This prevents the adjustable adaptor 10 from leaving the split boot 20 and creates a strong seal against leakage of lubricant. The user then may attach a clamp about the first end 22 thereby retaining the first end 22 about the adjustable adaptor. This allows a split boot 20 to be utilized that has a single inner diameter first end 22 thereby significantly decreasing the overall inventory and expenses.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An adjustable adaptor in combination with a boot having open first and second ends, the adaptor, comprising:

a first portion having a plurality of first ribs; and a second portion having a plurality of second ribs, wherein said plurality of second ribs are slidably engageable with said plurality of first ribs forming a tubular structure positionable within the selected open end of said boot.

2. The adjustable adaptor of claim 1, wherein:

said first portion includes a first brace from which said plurality of first ribs extend; and said second portion includes a second brace from which said plurality of second ribs extend.

3. The adjustable adaptor of claim 2, wherein said first brace has opposing sides and said first ribs are staggered upon opposing sides of said first brace, and wherein said second brace has opposing sides and said second ribs are staggered upon opposing sides of said second brace.

4. The adjustable adaptor of claim 2, wherein said tubular structure has a constant diameter lumen.

5. The adjustable adaptor of claim 2, wherein said tubular structure has a conical shape.

6. The adjustable adaptor of claim 2, wherein said first ribs and said second ribs include undercuts within a corresponding outer edge.

7. An adjustable adaptor for a boot, comprising:

a boot having a first end and a second end, wherein said second end includes a plurality of tabs;

a first portion having a plurality of first ribs;

a second portion having a plurality of second ribs, wherein said plurality of second ribs are slidably engageable with said plurality of first ribs forming a tubular structure that is positionable within said first end of said boot.

8. The adjustable adaptor for a boot of claim 7, wherein:

said first portion includes a first brace wherein said plurality of first ribs extend from; and said second portion includes a second brace wherein said plurality of second ribs extend from.

9. The adjustable adaptor of claim 8, wherein said first ribs are staggered upon opposing sides of said first brace, and wherein said second ribs are staggered upon opposing sides of said second brace.

10. The adjustable adaptor of claim 9, wherein said tubular structure has a constant diameter lumen.

11. The adjustable adaptor of claim 10, wherein said tubular structure has a conical shape.

12. The adjustable adaptor of claim 11, wherein said first ribs and said second ribs include undercuts within a corresponding outer edge for allowing said first end of said boot to catchably engage an adjacent rib.

* * * * *